United States Patent
Johnsen et al.

(10) Patent No.: US 8,694,517 B2
(45) Date of Patent: Apr. 8, 2014

(54) CONTEXT AWARE PHONEBOOK

(75) Inventors: Jahn Arne Johnsen, Oslo (NO); Lill Kristiansen, Oslo (NO); Egil C. Osthus, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 1073 days.

(21) Appl. No.: 12/096,671

(22) PCT Filed: Dec. 8, 2006

(86) PCT No.: PCT/NO2006/000474
§ 371 (c)(1),
(2), (4) Date: Oct. 31, 2008

(87) PCT Pub. No.: WO2007/067075
PCT Pub. Date: Jun. 14, 2007

(65) Prior Publication Data
US 2009/0150441 A1    Jun. 11, 2009

(30) Foreign Application Priority Data
Dec. 8, 2005    (NO) .................................. 20055831

(51) Int. Cl.
*G06F 17/30* (2006.01)

(52) U.S. Cl.
USPC .................... 707/758; 707/E17.044; 707/736

(58) Field of Classification Search
USPC ................................................ 707/736, 758
See application file for complete search history.

(56) References Cited

U.S. PATENT DOCUMENTS

| 2004/0249776 | A1* | 12/2004 | Horvitz et al. ................. 706/21 |
| 2005/0259802 | A1 | 11/2005 | Gray et al. |
| 2006/0010206 | A1* | 1/2006 | Apacible et al. ............ 709/205 |
| 2006/0080344 | A1* | 4/2006 | McKibben et al. ........... 707/100 |

FOREIGN PATENT DOCUMENTS

| WO | WO 2005/002187 A1 | 1/2005 |
| WO | WO 2005/025260 A1 | 3/2005 |

OTHER PUBLICATIONS

Hans-Werner Gellersen, "Where Computation and Artefacts Meet", Ubiquitous Computing, Upgrade, vol. 2, No. 5, Oct. 2001, pp. 12-16 and 1 cover page.

Maddy D. Janse, ed. "Report on Specification and Description of Interfaces and Services" 1st Amigo Project, Deliverable D4.1, Nov. 2005, pp. 1-69 and 1 cover page.

Albrecht Schmidt, "Ubiquitous Computing—Computing in Context" A thesis submitted to Lancaster University for a degree of Ph.D. in Computer Science, Nov. 2002, pp. i-xvii and 1-294.

* cited by examiner

*Primary Examiner* — Shyue Jiunn Hwa
(74) *Attorney, Agent, or Firm* — Oblon, Spivak, McClelland, Maier & Neustadt, L.L.P.

(57) ABSTRACT

A system including: a system control unit; a context aggregator operatively connected to the control unit, where the context aggregator is configured to on predefined events, receive context information about a user from two or more context sensors, calculate an aggregated presence status for the user based on the received context information, wherein a classification algorithm is used to calculate the aggregated presence status; and a user database operatively connected to the control unit, wherein the user database is configures to store user information for plural users, the user information comprising at least a user name, the aggregated presence status, available communications terminals and a probability of reaching the user on each of the available communication terminals, wherein the available terminals and their probability is a function of the aggregated presence status, wherein the system control unit is configured to, on demand distribute at least parts of the user information, including the available communication terminals and their probability, from the user database to a requesting device or application.

17 Claims, 11 Drawing Sheets

| Aggregated presence status | Mobile phone | Office phone | Office Video Phone | Home video | ... |
|---|---|---|---|---|---|
| In a meeting | 0,8 | 0,2 | 0,2 | 0 | ... |
| Holyday | 1 | 0 | 0 | 0,3 | ... |
| Busy | 0,7 | 0,4 | 0,4 | 0,1 | ... |
| meal | 1 | 0,1 | 0,1 | 0 | ... |
| Travel | 1 | 0 | 0 | 0,2 | ... |
| office | 0,3 | 0,9 | 1 | 0 | ... |
| Home office | 0,9 | 0 | 0 | 1 | ... |
| ... | ... | ... | ... | ... | ... |

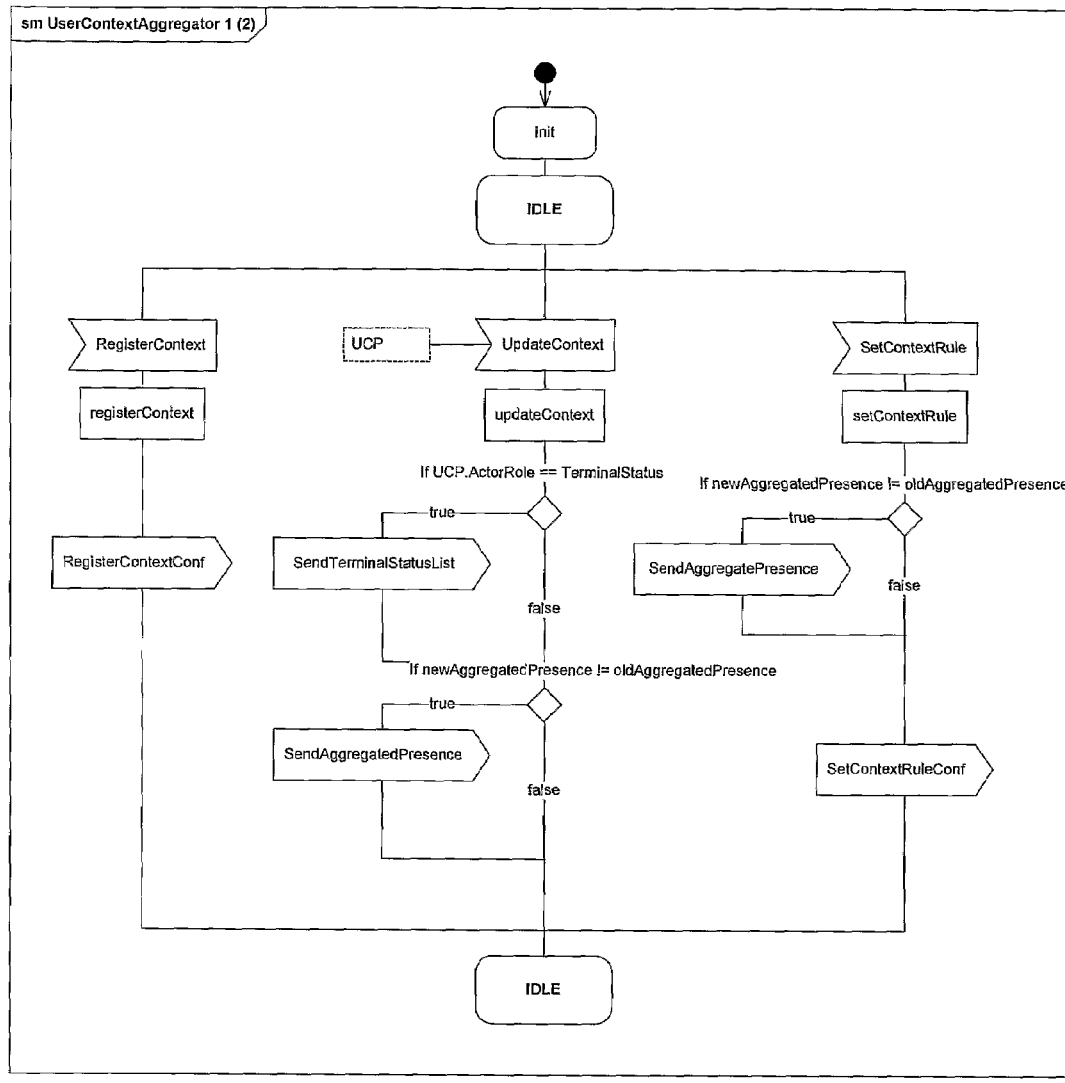
Figure 7 – Important transitions in the UserContextAggregator state machine.

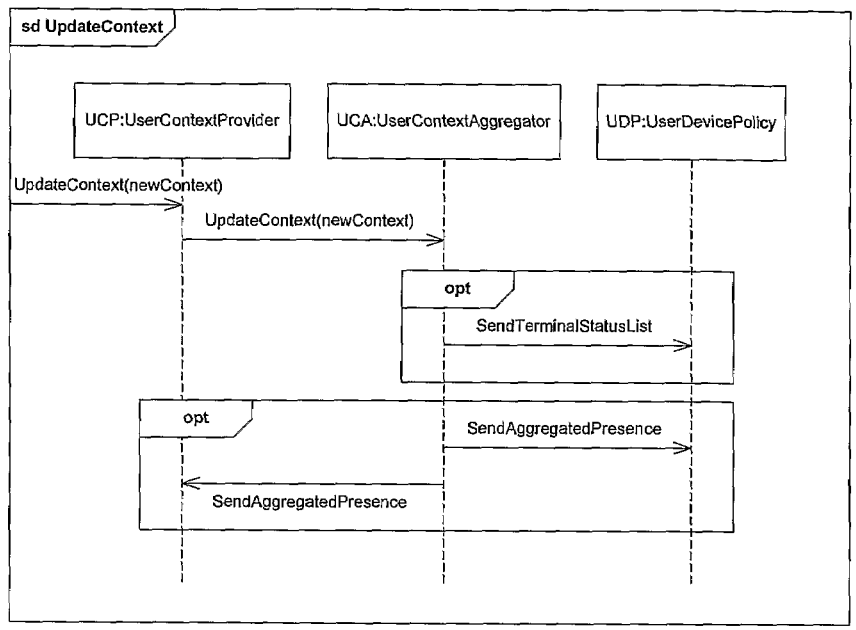
Figure 8 – An update in a context sensor is reported to the UCA.
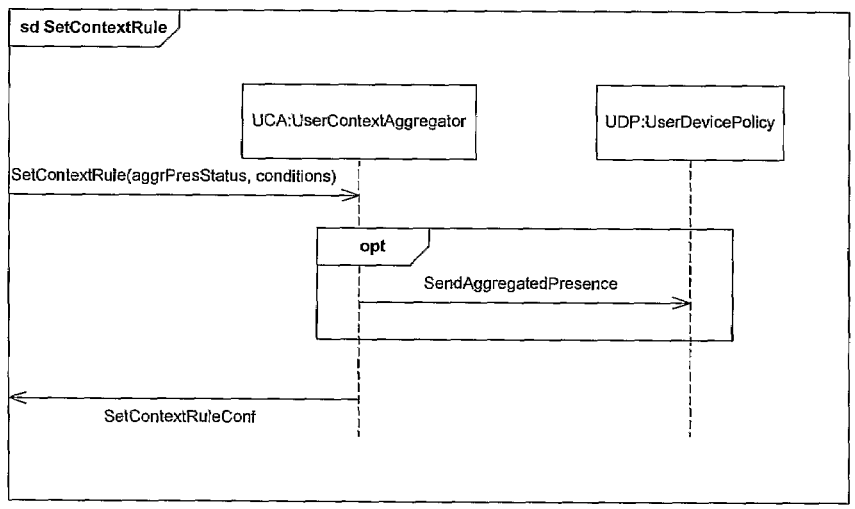
Figure 9 – A new context rule is inserted into the UCA.

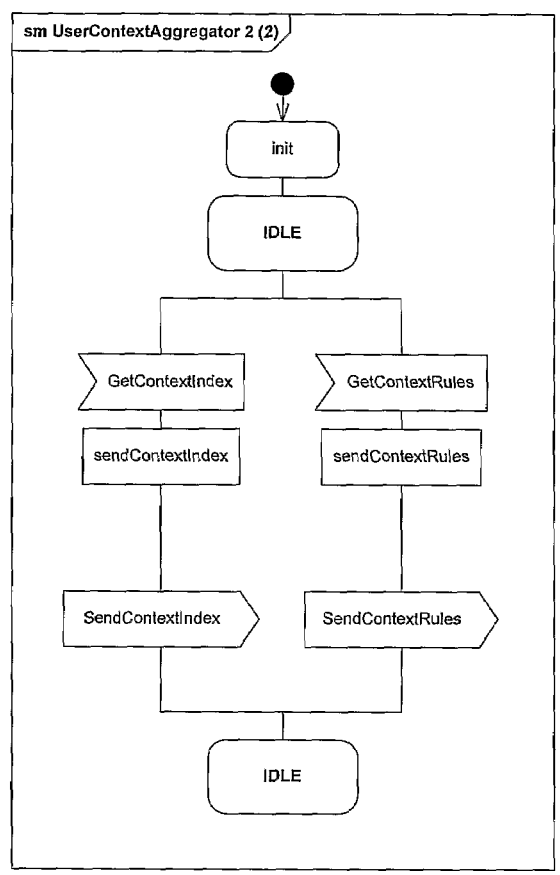
Figure 10 – The simple triggers and transitions from the UserContextAggregator state machine.

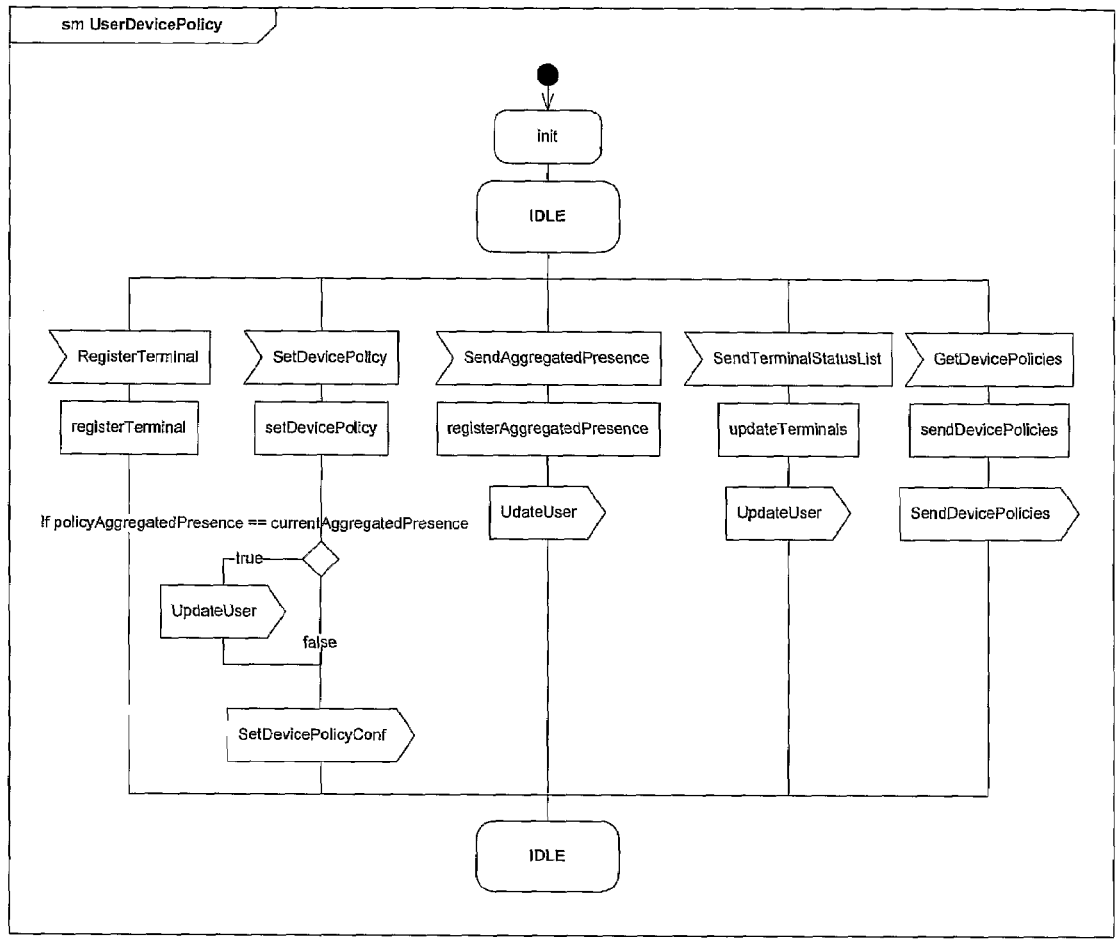
Figure 11 – The UserDevicePolicy actor's complete statemachine.
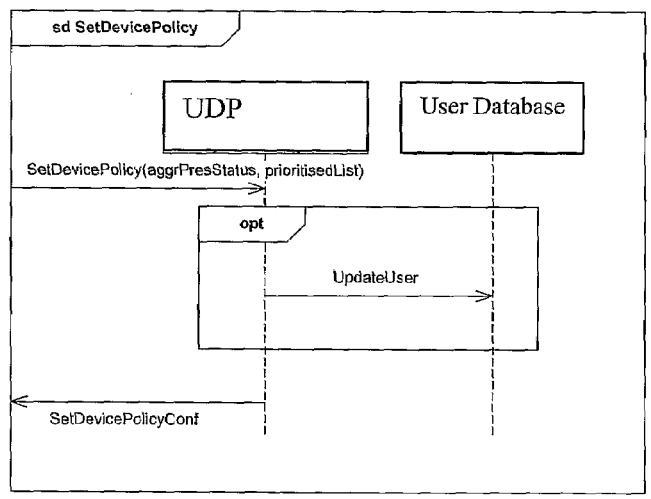
Figure 12 – A SetDevicePolicy message is received from the environment.

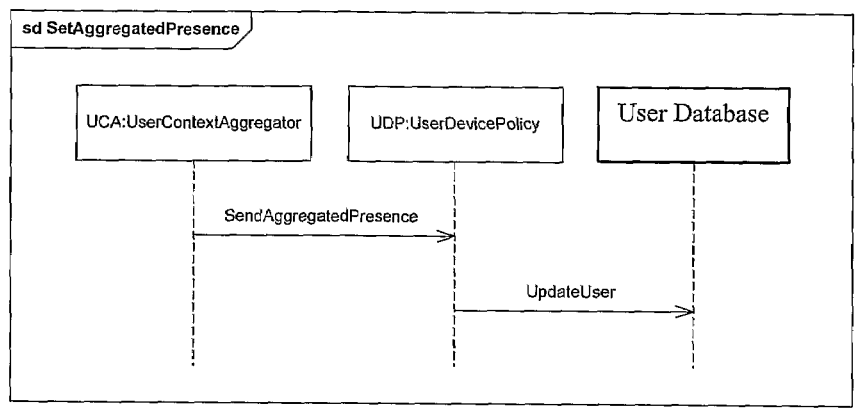
Figure 13 – A new aggregated presence status has been found and is sent to the UDP.
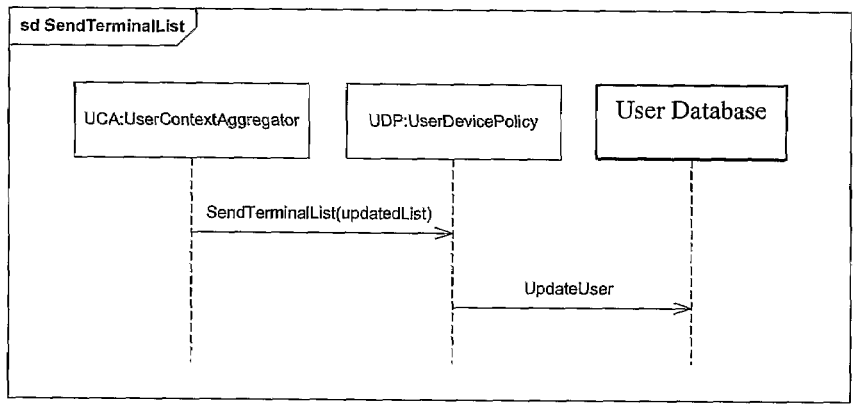
Figure 14 – A SendTerminalList message is sent from the UCA.

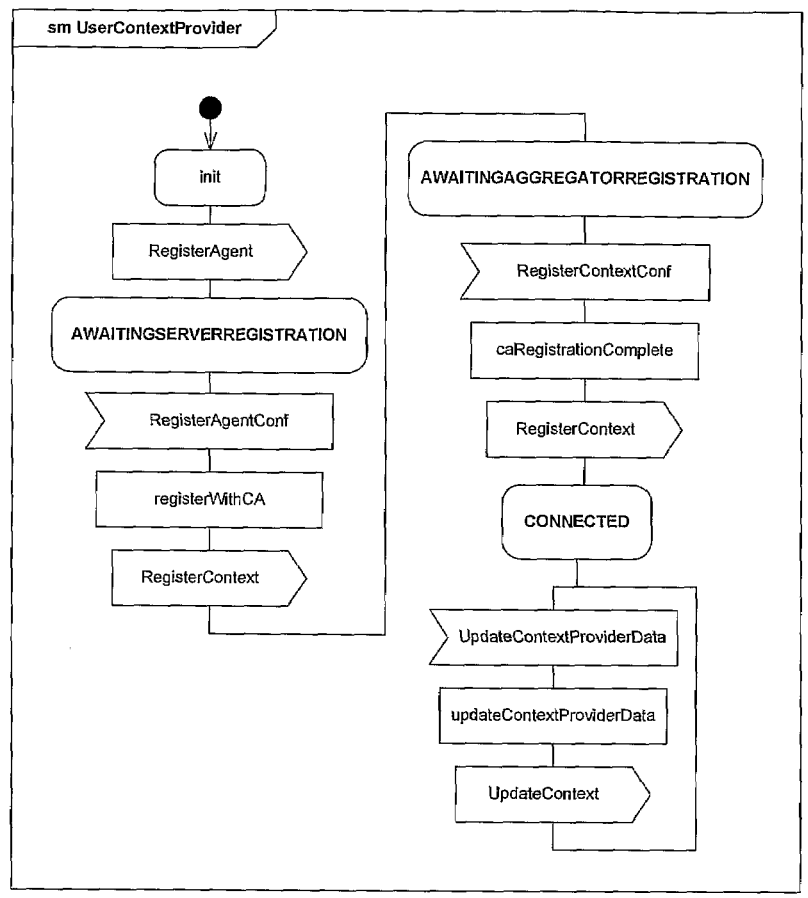
Figure 15 – The state machine of the generic UserContexProvider.

CONTEXT AWARE PHONEBOOK

FIELD OF THE INVENTION

The invention relates to a system, method and computer software for examining a user's context information and from this decide on a given automatic presence status which will be published alongside other information in an online contact manager.

BACKGROUND

Apart from the exception of e-mail, few computer applications in history have grown as fast as instant messaging (IM). With a solid base of IM—users in residential environments, the IM revolution has in recent years turned towards the business users. This adds to the already packed pool of communication opportunities and tools which are readily available for the average business man. A generic business man has e-agendas, e-mail, IM applications, electronic phone books, mobile phones, video conferencing opportunities, office phones, home office phones, etc. In fact, in today's world, people can communicate with "anyone, anytime, anyplace". However, as all these opportunities arise, so do problems. There are few people who want to communicate with anyone at any time in any place. There are times when you don't want to be disturbed (e.g. during important meetings, at seminars, during lunch break, etc). On the other side of the playing field, there are often times when you can't get hold of the person you wish to speak to. This can e.g. be because the person your are trying to reach is not in the location he/she is expected to be, or because the person you try to reach does not want to be disturbed, etc. Independent of whether you are the caller or the receiver of a communication session, lack of information about the availability of the receiver is the main cause for inappropriate or failed communication.

For the purpose of illustrating the problem at hand, we look at a scenario from a common office situation; Alice, a project manager for a large telecommunication firm, is about to leave her home office to attend a business meeting with some regular clients. She then suddenly remembers that her own department forgot to give her the last update on an important decision which the client just made. As this comes to mind, Alice brings up her phone book on her video conferencing system, and starts making calls. Knowing that Bob, the client's regular contact, is working from home and that he just had twin sons, she does not want to disturb Bob unnecessarily. Alice therefore figures that he is properly not her best choice. She decides to call Tim, a senior software developer in her project group. The phone book has four tuples for Tim; video phone, office phone, home office phone and mobile phone. As Alice is unaware of Tim's presence and location, she places her first call to his video phone. Tim however, just left for lunch, and is therefore not available on any of the office phones. After some minutes, Alice then tries to place a call to Tim's mobile phone. Since Tim is at lunch, he has to run back up to the office to fetch the information which Alice was after, and this takes quite some time. As a consequence of this, Alice misses her train, and is half an hour late for her meeting. Throughout this situation, Bob has been at his computer in his home office. As his wife is home on maternity leave, he hasn't been disturbed all day, but feels a bit disconnected from the rest of his firm.

When interacting and talking with each other, humans are quite successful at conveying information and reacting appropriately. That is, they are able to interpret situational information which in most cases is only implicitly given. This ability is in stark contrast to most of the current state-of-the-art computer and telecommunications systems, which in large are unaware of this context information. Consequently, there has recently been great interest in making applications more context-aware so that they can adapt to different situations and be more receptive to user's needs.

Some efforts have been made to aid this by broadcasting so called user presence information from user's Instant messaging programs (such as MSN Messenger, AIM etc.) in company phone books. This user presence status indicates the current situation of the user, e.g. if he is "idle", "in a meeting" or "busy". This presence status is useful as it allows for a person to decide whether it is appropriate to initiate communication or not. While this is certainly a step in the right direction, studies have shown that users are not always diligent about updating their presence status [1]. It is therefore desirable to derive presence information from other known data sources tied to a specific user.

Peddemors et al. [2] presented in their work a system, PLIM, which joined concepts of presence, location and IM in a new, extended IM system. It used a Bluetooth infrastructure to let a mobile device determine its current location. The PLIM system allowed also users to set rules that caused the system to update their presence to a given value when they were at a certain location. Although it may be effective and accurate in the given situations, it has the disadvantage of being rigid and largely unable to adapt to ever changing circumstances. There is also a problem when defining the actual rules for each given presence status. It is not always clear which context information that constitute e.g. the presence status "in a meeting".

There has also been done prior work by Milewski et al. [3] where they suggest a live addressbook which helped users to make more informed telephone calls and teleconferences. It was, amongst other things, able to display dynamic information on where the recipient was as well as the availability of the user (i.e. presence status). In this, Milewski et al. used a manually set do-not-disturb flag, but found that people often forgot to clear the flag when they became available, to the point that people considered the flag unreliable and ignored it [3].

Microsoft' Coordinate project [4] uses learning probabilistic models of peoples' meeting attendance and behaviour. These models are derived from information on PC use, time of day and meeting attendance. It uses this to decide whether messages to users are important and decides the best way to route these to the user. However, in this project a user is largely "invisible" to the system if he or she is not sitting at their computer working.

Therefore, it is the object of the present invention to overcome the problems discussed above.

SUMMARY OF THE INVENTION

It is an object of the present invention to provide an arrangement, method and computer software avoiding the above described problems.

The features defined in the independent claims enclosed characterise this arrangement, method and computer software.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 7 illustrates important transitions in the UserContextAggregator state machine FIG. 8 illustrates how an update in a context sensor is reported to the UCA FIG. 9 illustrates a new context rule inserted into the UCA FIG. 10 is a schematic overview of the simple triggers and transitions from the UserContextAggregator state machine FIG. 11 is a schematic overview of a UserDevicePolicy actor's complete statemachine FIG. 12 is a schematic overview of a SetDevicePolicy message received from the environment FIG. 13 is a schematic overview of a new aggregated presence status found and sent to the UDP FIG. 14 is a schematic overview of a SendTerminalList message sent from the UCA FIG. 15 is a schematic overview of the state machine of a generic UserContexProvider

DETAILED DESCRIPTION

Figure 1:
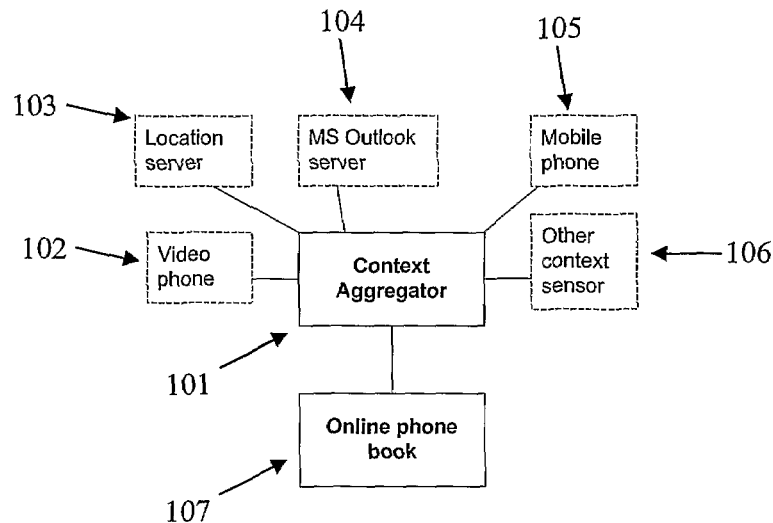
FIG. 1 is a schematic overview of the system

In the following, the present invention will be discussed by describing a preferred embodiment, and by referring to the accompanying drawings. However, people skilled in the art will realize other applications and modifications within the scope of the invention as defined in the enclosed independent claims.

The disclosed invention describes a context-aware contact manager (CACM) which decided what aggregated presence status a user should be associated with based on feedback from context sensors. The invention examines a user's context information and from this decide on a given automatic presence status which will be published in alongside other information in an online phone book. This presence status is useful as it allows for a person to decide whether it is appropriate to initiate communication or not. This is accomplished through the user context aggregator which is personal for each user. The user context aggregator contains a supervised learning algorithm which learns what presence status a user should be associated with by examining the available context information. The training of this engine can be done either by an administrator, or preferably, by the user himself. The Naïve Bayes has proved to be an extremely fast and accurate classifier and should be considered as a strong option in any future implementations of the CACM system. However, the invention is not limited to this classifier.

Personalization is done both through allowing personal classification rules, as well as through a policy approach to personal prioritizing of a user's communication devices based on his or her aggregated presence status. This can be expanded by also taking the group membership of the entity which requests the user information into account. The list of prioritized communication devices is displayed in an online contact manager providing a list of communication devises together with the probability of the contact being reachable on the respective devices.

By utilizing the power of supervised learning in rule set building, an extremely flexible classification system has been built.

Context-awareness is seen as an increasingly more important area of computer research. It enables systems to provide relevant information and services based on the current situational needs of the users. Through developing an understanding of context, users will no longer be forced to give systems explicit instructions at every step of their interaction. [5]

The relationship between context and a computing environment is defined by Dey et al. as:

"Context is any information that can be used to characterise the situation of an entity. An entity is a person, place, or object that is considered relevant to the interaction between a user and an application, including the user and applications themselves."

When referring to context in this paper, this definition will be used.

Context can be divided into several separate context data. So, in order to examine context, we need data; context data. In Dey et al., four types of context data were categorised as more important than others; location, identity, activity and time. All these different kinds of context data can be collected through various means and in the following, some of the context parameters, are briefly explained and presented Location Geographical location information describes a physical position in the world that may correspond to the past, present or future location of a person, event or device [7}. Such a location can be derived either from the user himself, or through some means of automatic retrieval.

Many different technologies can be used to provide such location information. Perhaps the most common of these are the Global Positioning System (GPS), which use an array of satellites to provide location information with an average margin of error within 10-20 m. In cell based telecommunication networks like GSM, the accuracy vary with which positioning method used. Simply utilising the cell ID gives an accuracy of 200 m to 10 km, depending on the cell size. Some newer GSM equipment use more advanced algorithms based on i.e. triangular measures (e.g. assisted GPS, time of arrival, angle of arrival).

For indoor positioning, there exist far more fine-grained technologies. Based on infrared (Ir), radio frequency (RF) or ultrasonic techniques, these technologies often use some kind of beacon or active badge.

Activity

Presence information is a status indicator that conveys ability and willingness of a potential communication partner, e.g. a user, to communicate. This information can simply be an online/offline status, stating e.g. whether the user is logged on or not. In recent standardization documents from the IETF, presence has been extended to include, among other things, information which indicates the user's current situation, or in some cases, the activity the user is currently occupied with [8]. This extension allows for the presence status to fit nicely under the activity label above.

The Presence Information Data Format (PIDF) and Rich Presence Extensions to the PIDF definition is examples of formats for exchanging presence information [9],[10].

Agenda

People utilise the agenda as a planning tool for their day, filling it with work or pleasure or both. An E-Agenda is an electronic version of the normal agenda, but may also contain a collection of data serving the need of the individual users.

Today, E-Agendas are widely used in most businesses across the globe. Some, but not all of these e-agendas, allow the users to share their individual calendars with co-workers and other individuals. As with the presence status, this context data parameter sort under the activity label above, and should have priority in a context-aware system.

Terminal Status

In [11], Rosenberg defines a communication device as:
"A communications device is a physical component that a user interacts with in order to make or receive communications. Examples are a phone, PDA or PC."

In this paper, a terminal is used as a synonym for device. Further, when we talk about the status of a terminal, we are here referring to whether or not the terminal is in use, offline etc. This status can be seen in connection with the previously mentioned activity label. A terminal in use tells us something about the activity of a user. It is also useful in determining which terminals that a requesting entity can use to reach the user.

The context data types described above is just a selection of context data that can be used with the present invention, and should not be considered as limiting to the present invention.

The context aware system According to the present invention is able to have multiple registered terminals for each user. One user may e.g. have a mobile phone, office phone, personal video conferencing equipment, home office phone and an IM/video client (running on a computer) registered with the system.

According to the present invention, the system will receive context data from multiple context data modules or sensors. The system shall be able to receive different types of context data: Geographical location, presence status, e-agenda, other users location, terminal status, computer activity, audio sensor, video sensors, etc. E.g if the user makes a call (or receives a call) on his/her office phone, the phone sends a signal to the system telling it that this user is currently speaking on his/her office phone. Sources of context data will hereafter be referred to as User Context Providers (UCP).

An overview of the system according to the present invention is shown in FIG. 1. The system automatically reviews the context data received from the UCP's, and from this data derive a new presence-status automatically. The presence-status is an aggregated value of all the received context data. The aggregated presence status can e.g. be; available, busy, meeting, holiday, home office, travel, etc. The possible aggregated states can be based on, but not limited to, IETF's RPID.

Further, according to the present invention, the aggregation is done by using a supervised learning classifier built by a training rule set. Classification is a task which occurs in a wide range of human activities. The broadest definition of the term could cover any decision or forecast which is made by assessing some currently available information. A classification procedure is then a formal method for repeatedly making such judgements in new situations. In supervised learning, one might know for certain the class set (here, the presence status), with the aim of establishing a rule which should be able to classify a new observation into one of the existing classes. The set may be a composite of both a default and a personal set and can be edited and reconfigured by both a central authority and the user himself. The rule set shall not solely depend on a given set of sensors.

The following non-limiting example rules should be possible to insert: If a user enters the conference room the user shall be marked as "meeting". If a user is in the lunch room, he/she shall be marked as "meal". If a device reports that it's currently in a call, the user shall be marked as "on-the-phone". If a user has registered an event in his e-agenda, the user shall be marked according to this when the activity starts (e.g. when the activity is "meeting", the user shall be marked as meeting etc.). When a user's location is unknown, his status shall be "away". It is important to note that this is by no means a complete rule set, but only simple examples of possible rules which should be possible to insert in the system.

Figure 2:
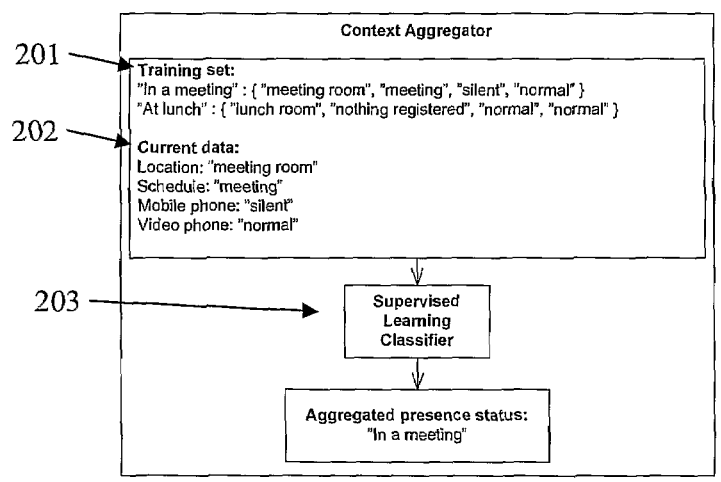
FIG. 2a illustrates a simple training set
FIG. 2b is a schematic overview a training situation

FIG. 2 is a schematic drawing of the context aggregator, with a non-limiting input example (a small training set (201) and a set of context data (202)), and a aggregated presence status found by the supervised learning classifier based on the small training set. The training set (201) states that when data from the location server (103) reports that the user is in a "meeting room", the users e-agenda (104) reports that a "meeting" is scheduled, the mobile phone (105) reports that the phone is set to "silent" and the users video phone status is "normal", the users aggregated presence is "in a meeting". Further, if the the location server (103) reports that the user is in a "lunch room", the users e-agenda (104) reports that "nothing" is scheduled, the mobile phone (105) is set to "normal" and the users video phone status is "normal", the users aggregated presence is "at lunch". Now the supervised learning classifier is trained to recognize these instances, and if the current data (202) from the UCP's is Location: "meeting room"; Schedule: "meeting", Mobile phone: "silent"; Video phone: "normal" the aggregated presence is set to "in a meeting".

Figures 2B, 3:
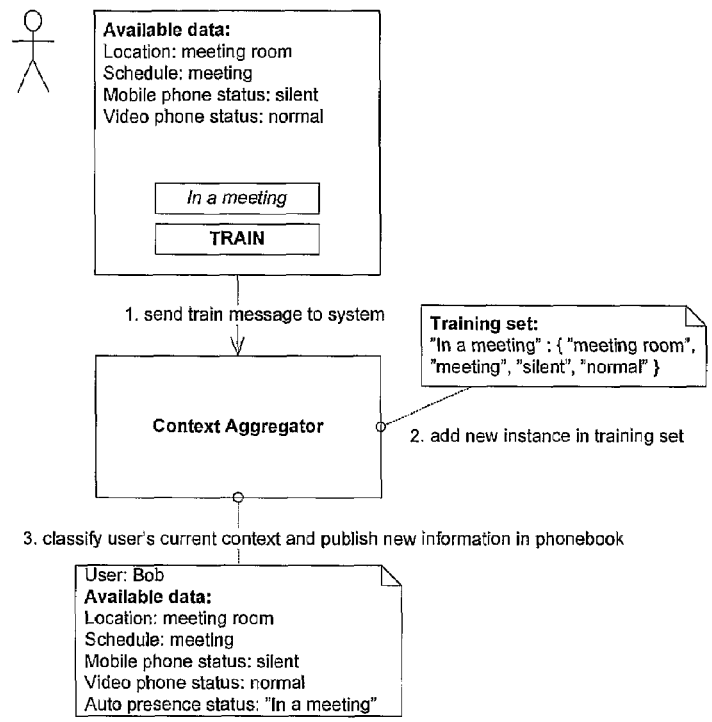
FIG. 3 illustrates a policy

One way of training a supervised learning classifier is by inserting real user data into the set, as shown in FIG. 3. This can be done by employing each user with a "train"—option on a mobile device. The user will select his or her current presence status (e.g. my current situation is "in a meeting") and the system will then insert this into the training set together with the available context data at the time. So, different instances in a training set will look something like this: "aggregate presence class shall be busy when the context data are as follows: location=conference room, agenda=meeting etc.". The machine learning classifier will generalise on the training set and create classification scenarios which are then used to classify a user's given context.

When the aggregated presence status has been derived, a personal policy set, defined by the user, is used to generate a prioritized list of communication devices. The list will also specify the probability of the user being reachable on each device on the list, respectably.

Figure 4:
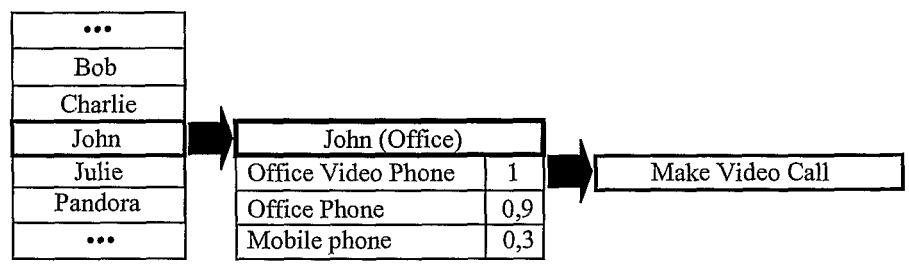
FIG. 4 illustrates a possible contact manager
Figure 5:
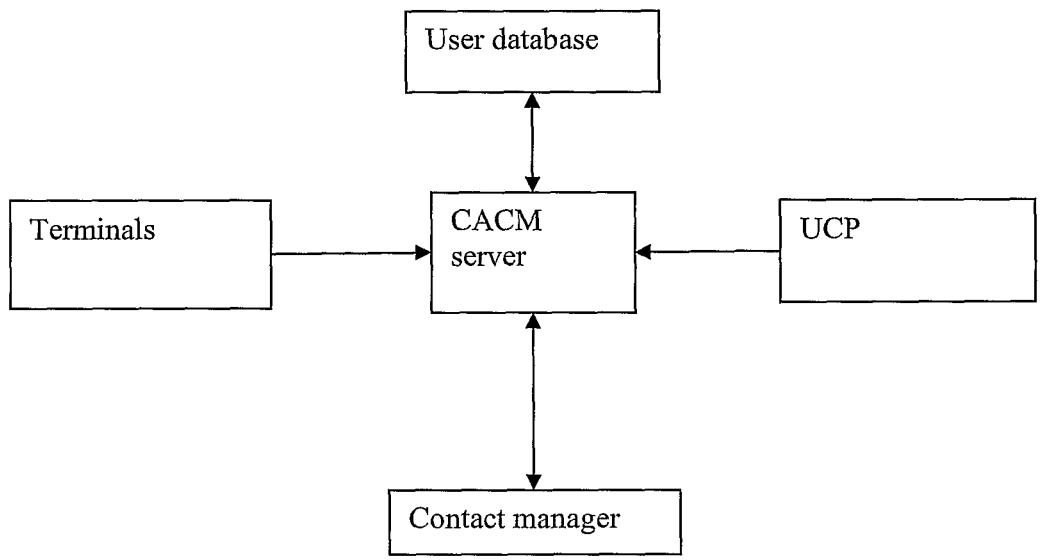
FIG. 5 is a schematic overview of the system
Figure 6:
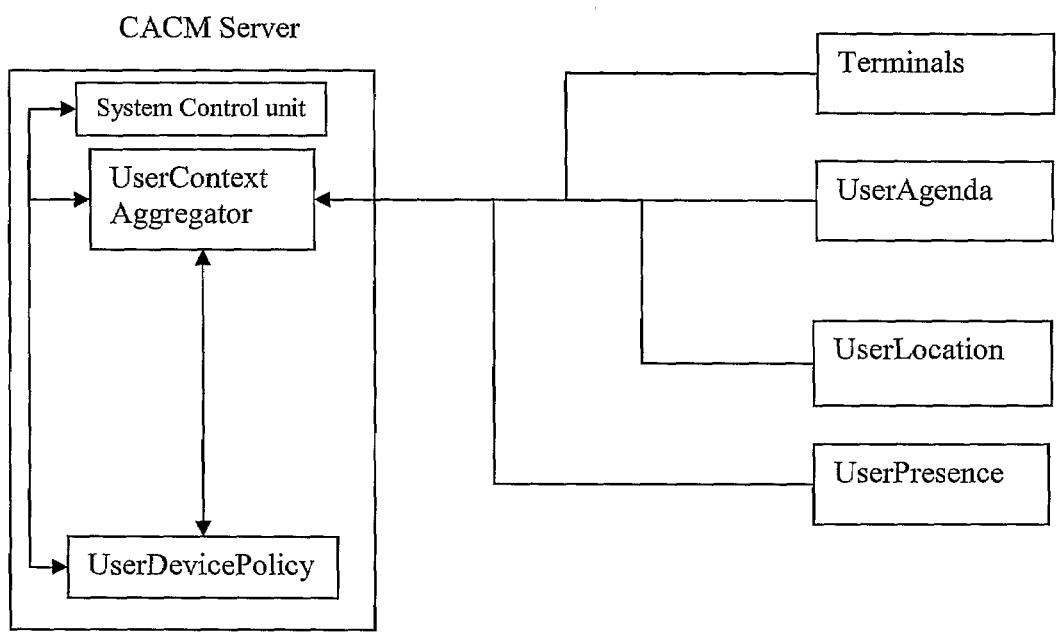
FIG. 6 is a schematic overview of the CACM server

An example policy can be seen in FIG. 4. The policy shall be based on the user's "aggregated presence". I.e. Aggregated presence status "holiday" can be defined as "give my mobile phone priority 1.0, my home phone priority 0.3 and my office phone and office video phone priority 0", or aggregated presence status "office" can be defined as "give my video phone priority 1.0, my office phone priority 0.9, my mobile phone priority 0.3 and my home phone priority 0". An extension of this, could be to also base the policy on group, i.e. "on-the-phone" and group "office" decides the prioritised device list. The policy shall be a centrally configurable policy. Each user shall be able to override defined parts of the policy on a personal basis.

Further, the system according to the present invention shall produce a prioritized (preferred) list over the user's registered terminals according to the pre-defined policy. This could be in the form of a contact manager, as shown in FIG. 4. When choosing a user from the contact manager, a new menu (or similar) will appear, showing the aggregated presence of the requested user, and said list of terminals. From the example in FIG. 4, we see that John is in his office, and that he prefers to be contacted on his office video phone or his regular office phone. John may also be reached on his mobile phone, but it's not as likely to be on.

Referring to the scenario described in the introduction, If the contact manager according to the present invention was available to Alice, she would have much more detailed information about the whereabouts and availability of her coworkers, and the scenario might look something like this instead: Alice, a project manager for a large telecommunication firm, is about to leave her home office to attend a business meeting with some regular clients. She then suddenly remembers that her own department forgot to give her the last update on an important decision which the client just made. As this comes to mind, Alice brings up her phone book on her video conferencing system, to start making calls. Knowing that Bob, the client's regular contact, is working from home and that he just had twin sons, she don't want to disturb Bob unnecessarily. In her presence aware phone book, she is informed of that her second option, Tim (a senior software developer in her project group), is at lunch. However, Bob appears to be at his computer in his home office, and is available on all media formats. It is therefore easy for her to make the decision to call Bob. Bob, who has been at his computer all day, is glad to help her, and the situation is handled within minutes. Alice can attend her meeting updated on all decisions the client has made, and arrives to the meeting as planned.

As mentioned above, a key feature to the present invention is to derive a user's aggregated presence. To accomplish this the system needs some sort of reasoning. Using rules to specify such behavior is a very simple way of making the system context-aware. Such rules can be expressions in some sort of logic (e.g. temporal logic or fuzzy logic) and then written or expressed in languages such as Prolog or RuleML. Whenever the context of a user's environment change, all the rule's conditions are evaluated and acted upon. This rule-based approach has the disadvantage of being rigid and unable to adapt to ever changing circumstances. A more dynamic approach is classification through machine learning which helps us circumvent this problem. In addition to being highly flexible the use of machine learning also introduces the ability to classify completely unknown scenarios. This means that even if the classifier encounters a new scenario which it has never seen before, it tries to predict a status based on the underlying previous data. It has been shown that these predictions often have a high degree of accuracy with the right training data [12].

A range of classifiers may be used with the present invention, and the most common classifier from each of three classifier approaches: Naïve Bayes from the statistical approach, Quinlan's C4.5 from machine learning and the Multilayer Perceptron from neural networks, has been tested. The results gave a clear favourite among the tested classifiers; the Naïve Bayes algorithm. On the tested rule set and test instances, Naïve Bayes was the fastest and by far the most accurate classifier. However, it should be noted that other classifiers can be used with the present invention.

Statistical approaches to classification generally have an explicit underlying probability model, which provide a probability for an instance to fall in each class rather than a straight-forward classification and are called probabilistic classifier.

Bayesian Classifiers are probabilistic classifiers based on the application of the Bayes Theorem. A Bayesian classifier has the ability to predict the probability in which a given instance belongs to a particular class. The Naïve Bayes classifier is based on the assumption of class conditional independence, i.e. the values of the attributes of an instance are assumed to be independent given the class of the instance. [13] This means e.g. that the probability that a fruit that is round, orange, 10 cm in diameter, etc. will be an orange can be calculated from the independent probabilities that a fruit is round, that it is orange, that it is 10 cm in diameter etc.

Let $A_l$ through $A_k$ be k different attributes with discrete values used to predict a discrete class C. Given an instance with the observed attribute values $a_l$ through $a_k$, the optimal class prediction value is c such that $P(C=c|A_l=a_l \hat{} \ldots \hat{} A_k=a_k)$ is maximal. Now, according to the Bayesian theorem, the probability of this equation equals $$\frac{P(A_1 = a_1 \wedge \ldots \wedge A_k = a_k \mid C = c)}{P(A_1 = a_1 \wedge \ldots \wedge A_k = a_k)} P(C = c)$$

In general, P could be computationally expensive to compute $P(A|C_i)$. To simplify this, the (naïve) assumption of class conditional independence is made. The assumption of this allows us to write $$P(A \mid C_i) = \prod_{k=1}^{n} P(x_k \mid C_i)$$

This states that the product of the probabilities for each of the attribute values of X for the given class $C_i$. Now, to classify an instance, one simply goes through all the different classes and compares $P(C|A)$ calculation. This classifier is known as the Naïve Bayes classifier. It can be shown that the Naïve Bayesian classifier has a training time of O(nk) where n is the number of instances and k is the number of attributes. This time complexity is optimal ([21]) and every learning algorithm which goes through each attribute value of every training instance must have the same or worse complexity.

An overview of the system according to one exemplary embodiment of the present invention can be seen in FIG. 12, and comprises three main components; Terminals, a CACM server (CACMS) and a User Database (UD).

The CACMS is the heart of the CACM system and can be viewed in FIG. 28. The CACM Server is the unit dedicated to continuously monitor all the users registered with the system.

The CACM Server consist of (at least) two modules; the UserContextAggregator (UCA) and the UserDevicePolicy (UDP). It is in these two modules, that much of the functionality of the system is placed. A system control unit is used to control the system.

Input to the CACM server is data from different kinds of context providers or context sensors. Context providers as discussed above can e.g. be: UserAgenda, UserLocation and UserPresence.

The UCA mentioned above has the job of deciding which aggregated presence should be chosen by examining the available context information. This is done by using a supervised learning classifier (e.g. Naïve Bayes) which has been trained by a given rule set. The rule set may be a composite of both a default and a personal rule set and can be edited and reconfigured by both a central authority and the user himself.

The UCA's basic behaviour can be seen in the state machine chart in FIG. 7 and FIG. 10. The tree's most important transitions are shown in FIG. 7, while the less important ones are shown in FIG. 10. Firstly, one can see the Register-Context signal is being received. This signal is sent to the UCA from a UCP and contains the name of the context data as well as an ArrayList of string options in which the UCP might take. The UCA will add this as an attribute to the implemented classifier and build a new classifier model. The next important signal is the UpdateContext signal which is also shown in the MSC in FIG. 8. This is also sent to the UCA from a UCP. The signal signifies a change in the UCP. This can e.g. be a change in location, agenda, etc. The UCA will process the change and send the new complete context into the implemented classifier. If there is a change in the classified aggregated presence, a SendAggregatedPresence signal will be sent both to the UCP which sent the update and the UDP. In addition to this, if the message came from a Terminal (e.g. office phone going from "idle" to "in a call", mobile phone going from "normal" to "silent"), then the new status list of the devices are also sent to the UDP. This is to ensure that the UDP always has an up-to-date list over the user's devices and their statuses.

The third and last of the emphasised trigger signals is the SetContextRule whose signal route is showed in FIG. 9. This signal contains a training rule (instance) for the classifier, i.e. the aggregated presence and the supplied context conditions, e.g. "aggregate presence shall be busy when the agenda context data provider signals an appointment". The UCA will take the new rule into account and build a new classifier based on its different context rules. If the new classifier model classifies the current context into a new aggregated presence class, then a SendAggregatedPresence will be sent to the UDP.

The two simple trigger signals in FIG. 10 are GetContextIndex and GetContextRules. The latter sends out all available context rules, while the former sends out a list of the available UCPs and their available string options.

The UserDevicePolicy (UDP) module contains information about the available terminals and a prioritizations among these according to a policy based on the user's aggregated presence. As an non-limiting example, based on the prioritization scale in IETF's PIDF standard, this prioritization is based on a scale from 0 to 1, with intervals of 0.1. The UDP state machine can be seen in FIG. 11. The UDP receives a forwarded RegisterTerminal message from the CACMS whenever a new terminal registers with the CACMS. The Terminal is given a priority of 1.0 and placed in the list of possible contact devices.

The SetDevicePolicy signal is typically sent by a control application as shown in FIG. 12 and contains a given aggregated presence and a prioritized terminal list for the provided aggregated presence. The UDP sends a confirm signal with the updated policy list back to the sender and places the new policy in its registry. If the new policy is concerned with the current aggregated presence, it is immediately placed into action and an UpdateUser signal is sent to the User Database.

A SendAggregatedPresence message comes from the associated UCA as shown in FIG. 13 and contains the new aggregated presence as classified by the UCA. This triggers a change in the current device policies which is changed. If no appropriate policies can be found, all terminals will be given a default priority of 1.0. The new information is then sent to the User Database by sending an UpdateUser signal.

SendTerminalStatusList is a signal which contains the statuses of all the user's terminals. It is sent from the UCA as shown by FIG. 21. This new list is inserted into the registry and the User Database is notified of the change through sending an UpdateContext signal.

Finally, the UDP also triggers when receiving a GetDevicePolicies signal. In this case, the UDP will simply send the user's complete list of device policies and prioritisation to the signal's sender.

A UserContextProvider's (UCP) (UserAgenda, UserLocation, UserPresence, etc.) provides some sort of context data to the UCA. This can e.g. be the user's agenda status (in a meeting), location (meeting room A), mobile phone ("silent"), etc. On start up, the UCP's registers with the UCA by sending the RegisterContext signal, which contains the name of the context data as well as an ArrayList of string options in which the UCP might take. These string options represent the different states the context data might have, e.g. a device status indicator may have string options 'idle', 'in a call' and 'offline'. An UCP can choose to be implemented either as a poll or push strategy to sense changes in the context environment. Which strategy is optimal, will vary with the different context sensors.

The generic UCP's state machine can be found in FIG. 15, where the basic transitions and signals are shown. On start up, the UCP's will send a RegisterContext to the UCA. When a confirmation from the UCA is received, the UCP goes into the IDLE state and will stay in that state for the remaining of its lifespan. The shown specification is a push solution where the UCP's send in any changes in the context data parameter when they arise. The UCP registers the new value and sends an UpdateContext message to the UCA. In a poll solution, a Timer signal is used, and the UCP will then check for any change in the context data parameter's value on predefined time intervals.

The User Database is a database containing records of all users registered in the CACM and their current prioritized list of communication devices. All users may in real life take part in several communities, e.g. his/her company, family, friends etc. The User Database can also serve as a group depository for contact and context information.

Figure 16:
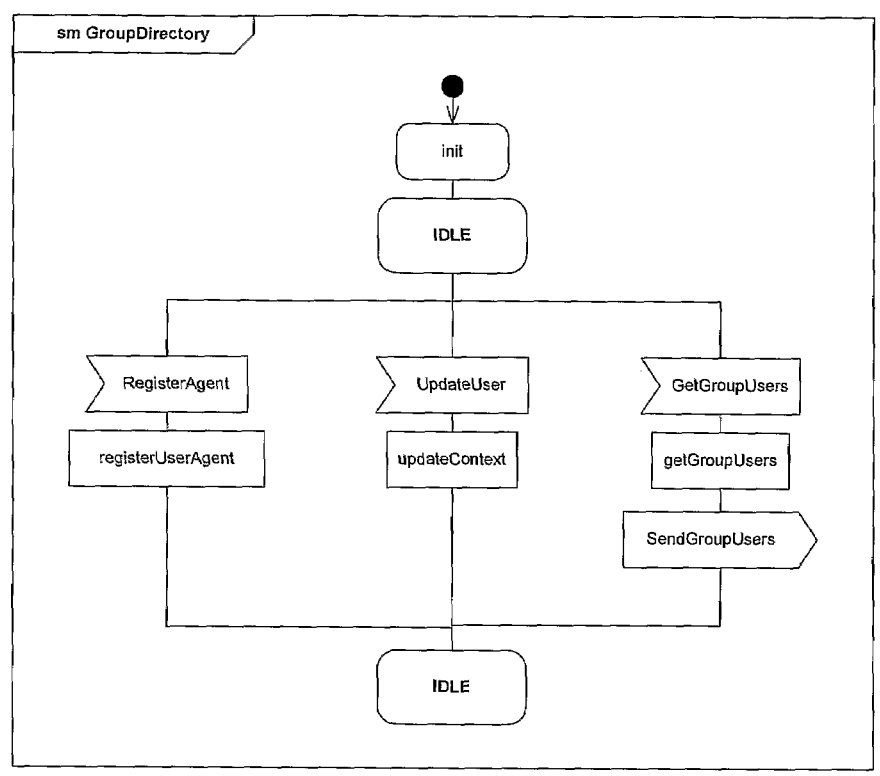
FIG. 16 is a schematic overview of the state machine of a User Database

As mentioned, the User Database has the purpose of collecting and storing data from the UDP. This consists of information on how to contact a user (i.e. information about the available terminals and a prioritizing among these) as well as information about a user's aggregated presence and context. It is from the User Database information is fetched when the context-aware contact manager according to one embodiment of the present invention is generated at a users interface. The User Database state machine can be seen in FIG. 16.

The User Database receives three signals: RegisterUser from CACMS, UpdateUser from UDPs and GetGroupUsers from application users of the GD service. The RegisterUser signals comes from the CACMS when new users are added to the system. The new user is then added to the User Database's address list and membership to the Database is granted.

When there is a change in a user's aggregated presence, an UpdateUser message is sent from the associated UDP to the User Database. This contains the user's new aggregated presence, and a new prioritized list of the available contact terminals. The information is stored in the User Database provided on demand to requesting devices or applications.

The final signal in the User Database state machine is the GetGroupUsers. This is sent from any applications which want to access the latest information about the group users. The GD responds with a SendGroupUsers signal which contains a HashMap of the different users, their terminals, contact priorities and last registered context.

In another embodiment of the present invention is the online contact manager synchronized, either regularly or on request, with the user's private or the user's dedicated contact manager, either on a server or on the user's equipment, such as a PC or mobile phone. Whenever the user is online, presence status information can be updated. Such presence information can also be added to names or addresses or phone numbers presented in other applications, e.g. as Microsoft does with their product "Live Communications Server" providing presence information in their applications, like MS Office including Outlook. Current systems for contact management integrates with directory services such as Active Directory, LDAP, X.500 and RADIUS-based authentication services like Microsoft's IAS. These services give administrators the ability to control user population and privileges, and allow users to share a central contact list across organizations.

All the features as described above can be realized in computer software by a person skilled in the art.

Using supervised learning in the UCA enables CACM not to be solely dependent on any particular context data sensor but rather having the ability to adapt to an ever-changing environment. With the expected explosion of context sensors in areas such as ubiquitous computing [5], this ability to adapt will become increasingly important in future context-aware systems. The adaptable nature of the UCA can be seen as giving the system a sense of artificial intelligence (AI)[14],[15]. This AI gives the system an ability to generalize on scenarios which is also particularly useful in a real-life implementation where learning instances may come from personal learning devices which auto-sense the current context.

Supervised learning could also be used directly in other reasoning parts of future context-aware systems. An example of such an application can be food recommendation software which may generalise on the eating habits of a person based on time of day, available choices etc.

To construct a context data sensor and introduce this in the classifying system, one only has to follow the general structure as explained above. The UCP will register itself with the UCA and instantly be available for new rule instances. This dynamic behaviour has implications beyond the CACM system, but can be used in many context-aware systems.

In addition to being able to construct highly flexible rule sets and classification systems, the use of supervised learning also introduces the ability to classify completely unknown scenarios. This means that even if the classifier encounters a new scenario which it has never seen before, it tries to predict a status based on the underlying previous data. It has been shown that these predictions often have a high degree of accuracy with the right training data [12].

[1] Schilit, B. and Theimer, M. "Disseminating active map information to mobile hosts", IEEE Network, vol. 8, pp. 22-32, October 1994
[2] Peddemors, A. J. H., Lankhorst, M. M., de Heer, J., "Combining presence, location and instant messaging in a context aware mobile application framework", Project GigaMobile, 2002
[3] Milewski, A. E., Smith, T. M, "Providing Presence Cues to Telephone Users", Proceedings of the ACM Conference on Computer Supported Cooperative Work (CSCW 2000), pp. 89-96, 2000
[4] Horvitz, E., Koch, P., Kadie, C. M., Jacobs, A., "Coordinate: Probabilistic Forecasting of Presence and Availability", Eighteenth Conference on Uncertainty in Artificial Intelligence, August 2002
[5] Chen, H. L., "An Intelligent Broker Architecture for Pervasive Context-Aware Systems", Doctoral thesis, 2004
[6] Dey, A. and Abowd, G., "Towards a better understanding of context and context-awareness", GVU Technical Report, June 1999
[7] Peterson, J., "A Presence-based GEOPRIV Location Object Format", GEOPRIV WG, Internet-Draft, Sep. 9, 2004
[8] Schulzrinne, H., Gurbani, V., Kyzivat, P., Rosenberg, J., "RPID: Rich Presence Extensions to the Presence Information Data Format (PIDF)", SIMPLE, Internet-Draft, Jul. 15 2005
[9] Schilit, B. and Theimer, M. "Disseminating active map information to mobile hosts", IEEE Network, vol. 8, pp. 22-32, October 1994
[10] Sugano, H., Fujimoto, S., Klyne, G., Bateman, A., Carr, W., Peterson, J., "Presence Information Data Format (PIDF)", IETF Network Working Group, RFC 3863
[11] Rosenberg, J., "A Data Model for Presence", SIMPLE, Internet-Draft, Aug. 23 2005
[12] Mitchell, T. M., "Machine learning", McGraw Hill, 1997
[13] Elkan, C., "Naive Bayesian Learning", Harvard University, 1997
[14] Michie, D., Spiegelhalter, D. J., Taylor, C. C., "Machine Learning, Neural and Statistical Classification", Ellis Horwood, 1994
[15] Nilsson, N. J., "Introduction to Machine learning", Stanford University, December 1996

The invention claimed is:

1. A system comprising:
a system control unit which executes computer executable instructions;
a context aggregator operatively connected to said control unit, where said context aggregator is configured to
on predefined events, receive context information about a user from two or more context sensors, and
calculate an aggregated presence status for said user based on said received context information, wherein a classification algorithm is used to calculate said aggregated presence status, the aggregated presence status is an indicator that conveys ability and willingness of the user to communicate, and the aggregated presence status is one of a plurality of predetermined aggregated presence status options; and
a user database, stored in a memory operatively connected to said control unit, wherein said user database is configured to store user information for plural users, said user information comprising at least a user name, and different lists of available communications terminals with assigned probabilities of reaching the user on each of the available communication terminals for each of the plurality of predetermined aggregated presence status options,
wherein said system control unit is configured to, on demand, distribute a context aware phone book including, from the database, the aggregated presence status calculated by the context aggregator and the list of the available communication terminals with the assigned probabilities of reaching the user on each of the available communication terminals that corresponds to the aggregated presence status calculated by the context aggregator, to a requesting device, which is a user terminal that is executing a phone book application.

2. The system according to claim 1, wherein said classification algorithm is a supervised learning classifier.

3. The system according to claim 1, wherein said context aggregator is further configured to receive a training set from said user.

4. The system according to claim 1, wherein said predefined events comprise when the context information in one or more of the context sensors changes, or on predefined time intervals.

5. The system according to claim 1, further comprising:
a policy unit configured to
receive a user defined policy, where said user defined policy define at least a set of communication terminals accessible to the user and their respective priority value for each possible aggregated presence status; and
store said user defined policy as a dataset in an internal register, where said dataset contains a tuple for each said possible aggregated presence status, defining said priority value for each said communication device.

6. The system according to claim 5, wherein said policy unit is further configured to redefine said user policy at predefined events.

7. The system according to claim 6, wherein said predefined events comprise when a new policy is submitted by the user, or when a new communication device is registered for said user.

8. The system according to claim 5, where upon change in a user's context information resulting in a new aggregated presence status, said system control unit is configured to obtain said tuple corresponding to said new aggregated presence status from said policy unit, and store at least new aggregated presence status and said tuple in the user database.

9. The system according to claim 1, wherein said system control unit is further configured to on demand retrieve user information about a user from said user database, and said user information consists of at least aggregated presence status, available communications devices and their priority.

10. A method comprising:
on predefined events, receiving context information about a user from two or more context sensors;
calculating an aggregated presence status for said user based on said received context information, wherein a classification algorithm is used to calculate said aggregated presence status, the aggregated presence status is an indicator that conveys ability and willingness of the user to communicate, and the aggregated presence status is one of a plurality of predetermined aggregated presence status options;
storing user information for plural users in a database, said user information comprising at least a user name, and different lists of available communications terminals with assigned probabilities of reaching the user on each of the available communications terminals for each of the plurality of predetermined aggregated presence status options; and
distributing, on demand, a context aware phone book including, from the database, the aggregated presence status calculated by the calculating and the list of the available communication terminals with the assigned probabilities of reaching the user on each of the available communication terminals that correspond to the aggregated presence status calculated by the calculating, to a requesting device, which is a user terminal that is executing a phone book application.

11. The method according to claim 10, wherein said classification algorithm is a supervised learning classifier.

12. The method according to claim 10, wherein said method further comprises:
providing at least one training set from each user for training said context aggregator.

13. The method according to claims 10, wherein said predefined events comprise:
when the context information in one or more of the context sensors changes, or on predefined time intervals.

14. The method according to claim 10, further comprising:
receiving a user defined policy at a policy unit, where said user defined policy define at least a set of communication devices accessible to the user and their respective priority value for each possible aggregated presence status; and
storing said user defined policy as a dataset in an internal register of the policy unit, where said dataset contains a tuple for each said possible aggregated presence status, defining said priority value for each said communication device.

15. The method according to claim 14, further comprising:
redefining said user policy when at least one of the following events occur:
a new policy is submitted by the user, or
a new communication device is registered for said user.

16. The method according to claim 10, wherein upon a change in a user's context information resulting in a new aggregated presence status, the method further comprises:
obtaining said tuple corresponding to said new aggregated presence status from said policy unit, and
storing at least new aggregated presence status and said tuple in the database.

17. A non-transitory computer readable storage medium encoded with instructions, which when executed by a computer causes the computer to implement a method comprising:
on predefined events, receiving context information about a user from two or more context sensors;
calculating an aggregated presence status for said user based on said received context information, wherein a classification algorithm is used to calculate said aggregated presence status, the aggregated presence status is an indicator that conveys ability and willingness of the user to communicate, and the aggregated presence status is one of a plurality of predetermined aggregated presence status options;
storing user information for plural users in a database, said user information comprising at least a user name, and different lists of available communications terminals with assigned probabilities of reaching the user on each of the available communications terminals for each of the plurality of predetermined aggregated presence status options; and
distributing, on demand, a context aware phone book including, from the database, the aggregated presence status calculated by the calculating and the list of the available communication terminals with the assigned probabilities of reaching the user on each of the available communication terminals that correspond to the aggregated presence status calculated by the calculating, to a requesting device, which is a user terminal that is executing a phone book application.

* * * * *